US009980266B2

(12) United States Patent
Goldhamer (10) Patent No.: US 9,980,266 B2
(45) Date of Patent: May 22, 2018

(54) COLLABORATIVE RADIO RESOURCE ALLOCATION IN CELLULAR DEPLOYMENTS

(71) Applicant: Mariana Goldhamer, Ramat Gan (IL)

(72) Inventor: Mariana Goldhamer, Ramat Gan (IL)

(*) Notice: Subject to any disclaimer, the term of this patent is extended or adjusted under 35 U.S.C. 154(b) by 143 days.

(21) Appl. No.: 14/787,869

(22) PCT Filed: May 5, 2014

(86) PCT No.: PCT/IB2014/061199
§ 371 (c)(1),
(2) Date: Oct. 29, 2015

(87) PCT Pub. No.: WO2014/181233
PCT Pub. Date: Nov. 13, 2014

(65) Prior Publication Data
US 2016/0088617 A1 Mar. 24, 2016

Related U.S. Application Data

(60) Provisional application No. 61/968,861, filed on Mar. 21, 2014.

(30) Foreign Application Priority Data

May 5, 2013 (IL) .......................................... 226178

(51) Int. Cl.
| | | |
|---|---|---|
| H04W 92/20 | (2009.01) | |
| H04W 72/04 | (2009.01) | |
| H04L 1/18 | (2006.01) | |
| H04L 5/00 | (2006.01) | |

(52) U.S. Cl.
CPC .......... *H04W 72/0446* (2013.01); *H04L 1/18* (2013.01); *H04L 5/0073* (2013.01); *H04W 72/04* (2013.01);
(Continued)

(58) Field of Classification Search
CPC .......................... H04W 76/02; H04W 72/0486
See application file for complete search history.

(56) References Cited

U.S. PATENT DOCUMENTS

| | | | |
|---|---|---|---|
| 8,903,402 B2* | 12/2014 | Guo ................ | H04W 36/0055 370/331 |
| 9,271,279 B2* | 2/2016 | Khoshnevis ...... | H04W 72/0413 |
| 2010/0267408 A1* | 10/2010 | Lee ..................... | H04W 52/243 455/509 |

(Continued)

FOREIGN PATENT DOCUMENTS

CN        101932100 A    12/2010

OTHER PUBLICATIONS

"Efficient resource allocation for device-to-device communication underlaying LTE network", by Zulhasnine, M., Changceng Huang ; Srinivasan, A., IEEE, Oct. 11-13, 2010.
(Continued)

*Primary Examiner* — Edan Orgad
*Assistant Examiner* — Emmanuel Maglo (57) ABSTRACT

A method for collaborative resource allocation includes defining a cluster of neighboring base stations (101, 102, 103, 104, 105, 106, 107) in a cellular network, the cluster including at least first and second base stations. A channel for information exchange is established between the first and second base stations. Messages are transmitted from the first base station to the second base station over the established channel to provide information to the second base station with respect to allocation of first time-frequency resources by the first base station. Second resources are allocated by the second base station responsively to the messages from the first base station.

24 Claims, 3 Drawing Sheets

(52) U.S. Cl.
CPC .......... *H04L 5/0016* (2013.01); *H04L 5/0094* (2013.01); *H04W 92/20* (2013.01)

(56) References Cited

U.S. PATENT DOCUMENTS

| | | |
|---|---|---|
| 2011/0105139 A1 | 5/2011 | On |
| 2013/0107798 A1* | 5/2013 | Gao .................. H04W 72/1226 370/328 |
| 2013/0336299 A1* | 12/2013 | Lee ...................... H04L 5/0007 370/336 |
| 2014/0024388 A1 | 1/2014 | Earnshaw et al. |
| 2014/0073368 A1 | 5/2014 | Teyeb et al. |
| 2014/0198776 A1* | 7/2014 | Nammi ................ H04B 7/0486 370/336 |
| 2015/0016387 A1 | 1/2015 | Elmdahl et al. |
| 2015/0173086 A1* | 6/2015 | Karaman .............. H04W 8/005 370/254 |

OTHER PUBLICATIONS

Enhanced Inter-cell Interference Coordination for Heterogeneous Networks in LTE-Advanced: A Survey; L. Lindbom, R. Love, S. Krishnamurthy, C. Yao, N. Miki, IEEE, Dec. 7, 2011.

R1-131028, "Evaluation results on small cell enhancement scenario 2a", Samsung, 3GPP TSG RAN WG1 Meeting #72b, Apr. 15-Apr. 19, 2013.
TS 36.214 V11.1.0 (Dec. 2012), 3GPP; RAN; E-UTRA; Physical layer; Measurements (Release 11).
TS 36.213 V11.2.0 (Feb. 2013), 3GPP; RAN; E-UTRA; Physical layer procedures (Release 11).
TS 36.331 V11.2.0 (Dec. 2012), 3GPP; RAN; E-UTRA; Radio Resource Control (RRC); Protocol specification (Release 11).
TS 36.422 V11.0.0 (Sep. 2012), 3GPP; RAN; E-UTRA; X2 signalling transport (Release 11).
TS 36.423 V11.4.0 (Mar. 2013), 3GPP; RAN; E-UTRA; X2 application protocol (X2AP) (Release 11).
TR 36.921 V11.0.0 (Sep. 2012), 3GPP; RAN; E-UTRA; FDD Home eNode B (HeNB) Radio Frequency (RF) requirements analysis (Release 11).
TR 36.922 V11.0.0 (Sep. 2012), 3GPP; RAN; E-UTRA;TDD Home eNode B (HeNB) Radio Frequency (RF) requirements analysis (Release 11).
TR 36.932 V12.1.0 (Mar. 2013) 3GPP; RAN; Scenarios and requirements for small cell enhancements for E-UTRA and E-UTRAN (Release 12).
PCT International Search Report and the written opinion of the International Searching Authority dated Aug. 3, 2014.

* cited by examiner

COLLABORATIVE RADIO RESOURCE ALLOCATION IN CELLULAR DEPLOYMENTS

FIELD OF THE INVENTION

The invention relates generally to digital communication systems and in particular to fast resource allocation and suitable channel measurements in cellular deployments.

BACKGROUND OF THE INVENTION

Future mobile deployments will be denser, each base station serving at a time only few users. Such deployments involve a very high level of interference and a very fluctuating traffic.

Submitted as part of the study conducted by 3GPP on small cells deployment, the contribution R1-130946 presents simulation results for the SINR (Signal to Interference and Noise Ratio) distribution in representative conditions. As can be seen in this contribution, in all scenarios the majority of users have an SINR below 10 dB, while in very dense deployments of 10 cells per clusters, the majority of users have an SINR below 5 dB and 40% of users have a negative SINR.

For resolving the situation, the contribution R1-131028 proposes a centralized approach: "The resource coordination could be considered as a centralized approach in that the UEs' CSIs (Channel State Information) from multiple cells or transmission points are collected and processed together. The result of the resource coordination would be forwarded to the individual cells or transmission points. Upon receiving the result of the resource coordination, the eNB would know how the wireless resources can be used for each of its cells. Each eNB would transmit its downlink according to the allocated wireless resources".

However the centralized approach, including the collection of measurement results from the controlled eNBs (base station in LTE) and UEs (user equipments in LTE), is negatively affected by the backhaul delays that occur in DSL loaded networks, and by the uplink limitations of the backhaul.

A number of interference assessment measurements were defined in LTE standards, for example:

1. RSRP (Reference Signal Received Power) and RSRQ (Reference Signal Received Quality) measurements defined in 3GPP TS 36.214 V11.1.0 (2012-12).
2. CSI reports by the UEs that can be taken as often as every few milliseconds.

By using the X2 collaborative interface defined in 3GPP 36.423 v11.4.0, an eNB can inform, by sending Load Indication message, the power reservation per PRB (Physical Resource Block). There is no information regarding the actual use of the frequency resources.

An eNB can reserve full subframes called ABS (Almost Blank Subframes) to be used at low power or low activity and to inform another eNB over the X2 interface. There is no information regarding the use of the other subframes.

SUMMARY

There is provided, in accordance with an embodiment of the present invention, a method for network operation, which includes defining a cluster of neighboring base stations in a cellular network. The cluster includes at least first and second base stations. A channel for information exchange is established between the first and second base stations. Messages are transmitted from the first base station to the second base station over the established channel to provide information to the second base station with respect to allocation of first time-frequency resources by the first base station. Second time-frequency resources are allocated by the second base station responsively to the messages from the first base station. In some embodiments the first and second allocations are identical. When the allocation is changed or released the second base station receives appropriate messages.

In some embodiments, the second resources are allocated so as to mitigate interference in communication between base station and user equipment.

In other embodiments the messages additionally specify a repetitive subframe, a transmission power or a spreading code.

Additional information can be provided by the first base station by transmitting the result of at least one measurement provided by an identified UE served by the first base station, from the list of RSRP, RSRQ, CSI, the last one including at least one of CQI, RI and PMI.

A possibility is the determination of the interference caused by a specific base station by using CSI-RS resources coordinated between base stations or alternately, the interference caused by an UE can be measured by using coordinated SRS transmission by an UE and reception by an interfered base station.

Beamforming can be used to protect an UE from the downlink interference caused by the second base station, provided that the interfered UE transmits SRS in the interfered frequency resources and the interfering base station assesses the channel matrix coefficients and creates nulls in the direction of the interfered UE.

There is also provided, in accordance with an embodiment of the present invention, a cellular communication system, which includes a cluster of neighboring base stations in a cellular network. The base stations are configured to establish a channel for information exchange between first and second base stations in the cluster, to transmit messages from the first base station to the second base station over the established channel to provide information to the second base station with respect to allocation of first time-frequency resources by the first base station, and to allocate second time-frequency resources by the second base station responsively to the messages from the first base station.

There is further provided, in accordance with an embodiment of the present invention, a wireless base station, which includes a radio interface, configured for communicating over a wireless network, and a communication interface, configured for exchange of messages with other base stations in the wireless network. A processor is configured to define a cluster of neighboring base stations in the wireless network, the cluster including at least one further base station, to establish a channel for information exchange with the at least one further base station via the communication interface, to transmit and receive messages from and to the at least one further base station over the established channel in order to exchange information with respect to allocation of time-frequency resources by the base stations, and to allocate the time-frequency resources responsively to the messages.

BRIEF DESCRIPTION OF THE DRAWINGS

The drawings do not represent an exhaustive representation of the possible embodiments of the invention and the invention is not limited to the arrangements presented in the drawings.

The drawings are.

DETAILED DESCRIPTION

Embodiments of the invention are described hereinafter in conjunction with the figures.

The following description uses terminology familiar to those skilled in wireless networks and in particular in LTE technology. This should not be considered as a limitation for the applicability of the invention to other similar technologies.

General Aspects

Radio communication in cellular networks includes air protocols that enable communication between a radio base station (eNB in LTE) and a mobile device, or User Equipment (UE in LTE).

In addition, there is communication between eNBs, defined for LTE in 3GPP TS 36.423 v11.4.0 (2013-03). This standard contains the network-layer signaling procedures (messages) of the control plane between eNBs, also known as X2 interface.

As dense deployments are typically using small cells, we use alternatively the terms eNB (base station) and SCeNB (small cell base station) to refer to base stations in the description that follows.

The embodiments disclosed below address the allocation of resources by an eNB; in LTE the resources are time-frequency resources, the time dimension being subframes or one or more frames. The frequency dimension refers to specific PRBs and frequency carriers used as a standalone carrier or in frequency (carrier) aggregation mode. The PRBs are further grouped in subbands.

In the disclosed embodiments, some reference signals, for example Channel State Information-Reference Signals (CSI-RS) or Sounding Reference Signals (SRS) are also considered time-frequency resources which can be scheduled.

In CDMA-based technologies, such as HSDPA and its evolution, the resources are time-code-frequency resources, the time dimension being subframes or one or more frames. The code refers to the spreading code or multiple spreading codes. The frequency dimension refers to frequency carriers (channel) used as a standalone carrier or in frequency (carrier) aggregation mode.

In single-carrier based systems, the time-frequency resource refers to frames (time dimension) and frequency carriers occupying specific frequency channels.

The allocation of resources, including data scheduling and the modulation and coding rate, transmission power, and MIMO spatial properties, is done for both DL (downlink) or UL (uplink) direction of transmission or for D2D (Device to Device) communication.

The term "fast" is used relative to the average time interval between arrivals of packets in neighbor eNBs. In other words, a resource allocation (or reallocation) performed by a network element is "fast" if its execution time is less than this average time interval. It should be noted that, when using FTP or video traffic, the typical backhaul delays are shorter than the inter-packet arrival time.

Basic Principles

In static ICIC (Inter-Cell Interference Coordination) mode, the resources for transmissions at different power levels are semi-statically allocated. The procedures of "dynamic ICIC" defined in this patent application allow a LTE network to react in a fast mode to traffic fluctuations and changes of transmission powers, through appropriate resource allocation by collaborating eNBs.

The basic principles of the present embodiments are based on six elements, which will be described below:
 1. Micro-cluster forming;
 2. Communication between the eNBs in a micro-cluster;
 3. Fast information sharing, allowing the time-frequency resource scheduling by each small cell independently;
 4. Optional sensing by the regular eNB radio receiver of the DL (downlink) receiver;
 5. Optional learning;
 6. Resource selection strategy and handling of resource selection contentions.

Micro-Cluster Forming

The micro-cluster is UE-centric, as each eNB either receives UE' neighbor list from the served UEs, or detects the identity of the strongest interferers, by using its regular radio receiver or the embedded DL Receiver or by provisioning.

Figure 1:
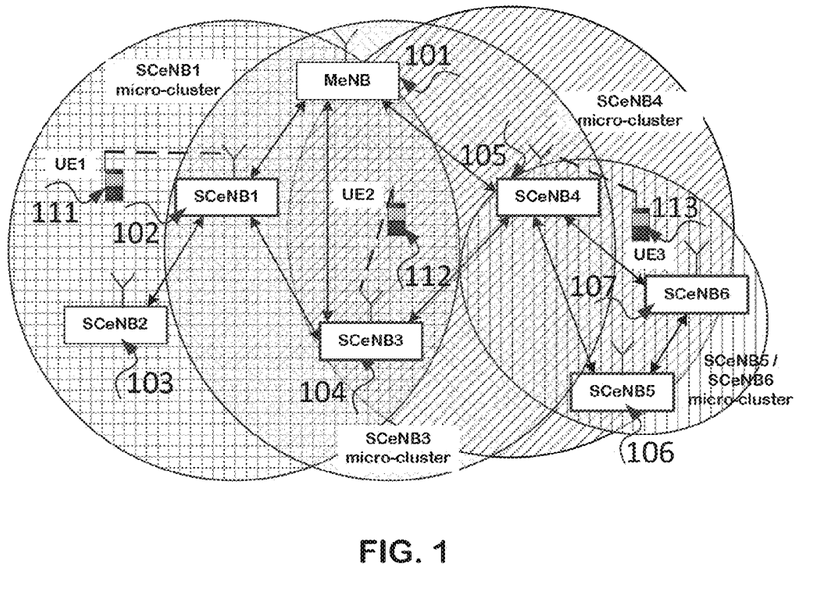
FIG. 1—Represents micro-clusters of collaborating eNBs
FIG. 2—Represents an example of system operation
FIG. 3—Represents a base station block diagram.

In the example in FIG. 1 is shown a wireless network, with examples of UEs (111, 112, 113) connected to eNBs (respective 102, 104, 105). Four micro-clusters are formed by the small cells eNBs (SCeNB) and in some cases a macro eNB (MeNB). In this example, each micro-cluster includes the following eNBs:

SCeNB1-102 micro-cluster: SCeNB1-102, MeNB-101, SCeNB2-103, SCeNB3-104

SCeNB3-104 micro-cluster: SCeNB3-104, MeNB-101, SCeNB1-102, SCeNB4-105

SCeNB4-105 micro-cluster: SCeNB4-105, MeNB-101, SCeNB3-104, SCeNB5-106, SCeNB6-107.

SCeNB5-106/SCeNB6-107 micro-cluster: SCeNB4-105, SCeNB5-106, SCeNB6-107.

The number of eNBs in a micro-cluster can be limited by practical considerations, such as the number of fast point-to-point links which can be established. In case of ADSL backhaul, Over-The-Air (OTA) communication is a suitable fast connection.

The eNBs belonging to multiple micro-clusters can serve as relays and transmit the information from one cluster to the adjacent one, enlarging the collaborative area relevant to this embodiment.

Direct Communication Between the eNBs in a Micro-Cluster

In some embodiments, the direct communication can be over the backhaul or Over the Air.

OTA MP-MP (Multi Point to Multi Point) communication for X2 transmission can be provided by a number of UEs collocated with each eNB in the network, as proposed in U.S. patent application Ser. No. 14/174,302 by the same inventor, whose disclosure is incorporated herein by reference.

In the case of two transmissions scheduled per frame, the latency of OTA communication is only 5 ms.

The existing X2 interface does not support the creation of OTA links over the eNB-UE radio interface (Uu). Such a link could be routed based on the physical eNB identifier instead of its IP address, as is the case now for the routing of the X2 interface.

An eNB could use in parallel both backhaul and OTA communications, but for achieving this, the 3GPP standards TS 36.422 v11.0.0 and TS 36.423 v11.4.0 should be modified to allow two SCTP streams and the set-up of two different links.

Given the real backhaul delays, defined in 3GPP TR 36.932 v12.1.0, OTA communication may incur lower delays than a DSL backhaul, depending on the number of the collocated UEs.

Fast Information Sharing

Fast information sharing allows time-frequency resource scheduling by each small cell independently.

The information which is shared includes information which is relevant for deciding the allocation of resources to a specific UE, including:

A. The physical identifier or other identifier of the eNB providing the information.

B. In addition, for TDD (time-division duplex) systems, the frame configuration index should be included.

C. Time-frequency resource usage in OFDMA/SC-FDMA context, including information of the TTI (subframe) number and the used PRBs. It is expected that a resource allocation is kept until a change occurs. The allocated subframe may repeat according to a pattern in the following frames.

A change in the allocation of time-frequency resources may be caused either by the arrival of a new packet, which needs its own time-frequency resources, either a change in the resource allocation in another eNB in the cluster.

For allowing the detection of a possible contention (two eNBs strongly interfering allocate the same resource in the same time), the actual start of resource usage could be delayed with an amount of time depending on the actual backhaul delay. However, given the reduced number of users, an alternate strategy is "try and resolve the contention if needed" or something in between, i.e. using a small delay for the actual start of resource usage.

D. Additional Resource Usage Information, like Tx power, which can help for a fast preview of the amount of created interference by the eNB receiving this information.

E. Precoding (PMI—precoding matrix index) per eNB layer, which can help in coordinated beamforming, such to avoid creating interference in a given direction.

F. Resource Usage Release: when the transmitter buffer is empty or a short time after that (few frames), the resource should be released.

G. Feedback info: NACK response on the specific resource allocation, informing the eNB which intends to use the resource that the created interference will be unacceptable (NACK is a pro-active contention signaling). As part of the response may be indicated an alternative time-frequency resource for usage.

H. UE and eNB positioning information, which in conjunction with at least the transmitted power can also help in the assessment of the created interference in up-link, respectively in downlink.

I. HARQ (Hybrid Retransmission ReQuest) rate, giving information on the retransmission rate due to the interference caused by the actual data transmission.

High HARQ/ARQ rate is caused by the high interference created by other eNB(s) or UE(s). When an eNB will receive this information will know also to which time-frequency resource refers. The eNB using these resources can make changes to either the used time-frequency resource or to the used power for reducing the created interference in the specific time-frequency resource.

J. Sensing information by the regular radio eNB receiver or by the DL-Receiver, which can assess the interference level on the unused eNB resources at the eNB location. This information can give a rough estimation of the interference level at the eNB location.

A description of the DL-Receiver is provided in the standards 3GPP TR 36.921 v11.0.0 and TR 36.922 v11.0.0.

K. UE measurements of RSRP, RSRQ, CSI over coordinated IM-RS are described below.

As long as there is no contention between the RSs sent by different eNBs, RSRP is a measure of the eNB signal power. As well known, high RSRP means that the UE will be less affected by interference. Sending this information to a collaborating eNB will help that eNB to determine whether an UE served by the transmitting eNB is affected by interference. Based on this observation, when sending the information on the used time-frequency resources and RSRP reported by an UE, an eNB should also add the Identity of the UE using those resources.

RSRQ, defined as the ratio between RSRP and the total received power within a frequency channel, including interference, provides information of the interference experienced by that UE. In case of high interference a collaborating cell should schedule its transmissions such to avoid creating interference in the time-frequency resources used by the UE.

An eNB can request specific power reduction to be applied by one or more eNBs for transmissions within the allocated time-frequency resources. The quantitative power reduction is indicated in dB or is indicated as reduced power or reduced activity (almost blank resource) and expects an ACK before scheduling new traffic.

Learning

As result of the learning process each eNB creates statistics regarding the correlation between the shared parameters and its own measurements or the reports of the associated UEs.

An eNB can also create statistics regarding the influence on resource usage by other SCeNBs based on their performance degradation per TTI (subframe) and PRB, including degradation shared by these other eNBs through the transmission of information related to RSRP, RSRQ, CSI.

The learning process can be active, i.e. the eNB can schedule specific configurations of data or reference signals so as to create different interference combinations of interest. The collaborative CSI measurements are addressed in more detail below.

The statistics should be continually updated.

Resource Allocation Strategy

Within the micro-cluster, some time-frequency resources should be reserved for dormant eNBs and handover execution enabling starting communication without delays.

In cases of potentially high interference or when the wireless medium is relatively unused, the eNB scheduler should give preference to resources not used yet in the micro-cluster.

It is advantageous to keep the same power per each subframe and PRB, thus enabling the use of the statistics created through a learning process. The power allocation depends of the interference coordination strategy: ICIC (frequency domain) or eICIC (time domain).

If there are no available free resources, the statistics accumulated in the learning phase should be used for targeting an optimization function so as to increase either the throughput of the eNB (selfish approach) or the capacity of the micro-cluster, eventually including that of the adjacent micro-clusters. The non-selfish approaches may use interference pricing algorithms.

Example of Operation

Figure 2:
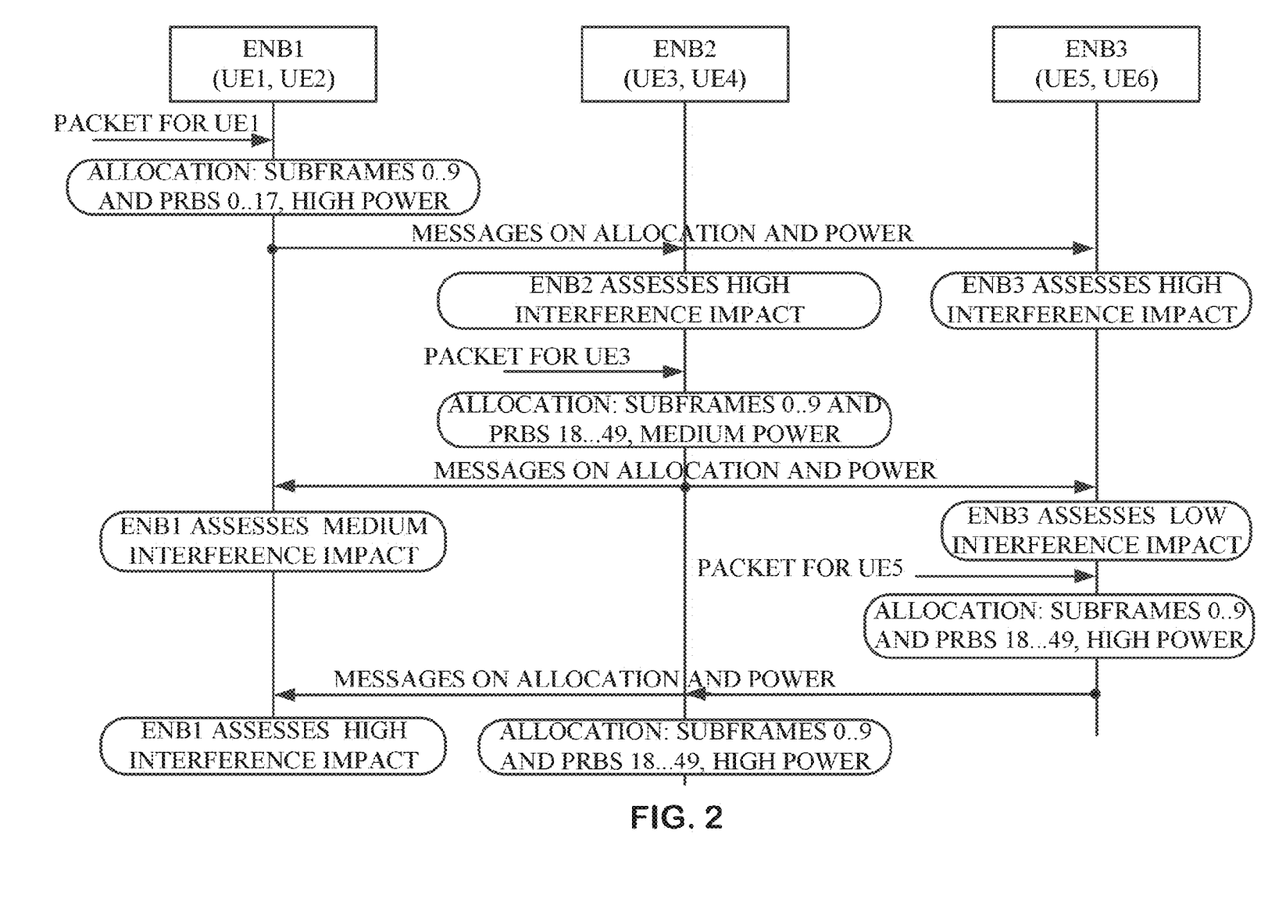

In FIG. 2 is presented an example of system operation and use of messages including the information on the allocated time-frequency resources and the associated transmission power.

In the initial state no base station has messages to transmit. Each base station has two associated UEs.

A first packet arrives at eNB1, to be transmitted to the served UE1. eNB1 decides to allocate the PRBs 0 . . . 17 across all the subframes 0 . . . 9, while using high power.

eNB1 informs eNB2 and eNB3 about this allocation; as consequence, eNB2 and eNB3 assess the impact of interference on their served UEs based on UEs CSI reports and both eNBs come to the conclusion that the interference impact is high.

A packet arrives at eNB2, to be transmitted to the served UE3. eNB2, for avoiding the high interference, decides to allocate for its transmission the subframes 0 . . . 9 and the remaining PRBs 18 . . . 49. eNB2 decides to use medium power.

eNB2 informs eNB1 and eNB3 about this allocation. As consequence, eNB1 and eNB3 assess the impact of interference on their served UEs; eNB1 assesses high interference impact while eNB3 comes to the conclusion that the interference impact is low.

A packet arrives at eNB3, to be transmitted to the served UE5. eNB3, for avoiding the high interference of eNB1, decides to allocate for its transmission the resources used by eNB2, based on the assumption that eNB2 will increase the power for compensating the interference produced by eNB3 transmission.

eNB3 informs eNB1 and eNB2 about this allocation. In response, indeed eNB2 increases the power and both eNB2 and eNB3 will operate in the re-used resource. eNB1 perceives now high interference impact, but in un-used resources.

The total resource utilization per system, while assuming a 10 MHz bandwidth, is:

$$RU\_1=10*18(\text{for eNB1})+10*32(\text{for eNB2})+10*32 \\ (\text{for eNB3})=820,$$

Where:
10 represents the number of subframes and
18 and 32 represent the number of PRBs.

As percentage of the channel resources, the resource utilization is:

$$RU\_1 \text{ is } 820/500=1.64.$$

For comparison, if each base station will ask the other base stations to reserve almost blank resources (low power or low activity) for each transmission, after the first packet eNB1 will ask both eNB2 and eNB3 (because will not know which one is creating the interference) to blank subframes 0 . . . 9, PRBs 0 . . . 17, after the second packet NB2 will ask eNB1 and eNB3 to blank subframes 0 . . . 9, PRBs 18 . . . 49. As result, eNB3 would have blank all the resources, remaining nothing for the transmission of packet 3. This packet would have to be delayed until one of the started eNB1 or eNB2 transmission will end.

As consequence, the User Perceived Throughput, as defined in 3GPP TR 36.814 would be significantly lower.

In addition, the resource utilization per system will be:

$$RU\_2=10*16(\text{for eNB1})+10*32(\text{for eNB2})+10*0(\text{for eNB3})=500$$

As percentage of the channel resources, RU_2 is 500/500=1, i.e. 64% lower when compared with the exemplified embodiment.

Now let's suppose, in case of our approach, that a packet arrives at eNB1 for UE2 (this case is not illustrated in FIG. 2), while none of the resources has been released. eNB1 is looking for resources to schedule this packet, but the resources not used for UE1 are highly interfered. To resolve the situation, eNB1 selects a small resource, used already by eNB2 and eNB3, for example the subframes 8 and 9 for the PRBs 18 . . . 49. eNB1, and sends a new message with this resource allocation and asks specifically eNB2 to reduce the transmission power by 6 dB, based on the medium interference impact, and eNB3 to reduce the transmission power by 12 dB (based on the high interference impact) in these resources. eNB1 waits for ACK before scheduling new traffic. In this way, the interference burden is shared across the eNB1, eNB2, eNB3, while the resource utilization factor remains higher than 100%.

Contention Resolution

Broadcasting of the resource allocation information enables an eNB to detect in a timely mode that its own resource scheduling has been also selected by another interfering eNB.

In such a case that two or more eNBs select previously free resources for the next frame transmissions, each eNBs detecting the contention of resource allocation should analyze whether the scheduling contention will create harmful interference to itself or to another eNB using the same scheduling (i.e. identical time-frequency resource allocation).

Below are a number of examples when same time-frequency resources can be used by two collaborating eNBs:

A. One eNB uses low power for transmission
B. The UE served by one eNB is not sensitive to the interference created by the other eNB
C. One eNB has spare capacity and can use lower modulations and coding rates which increase the resistance to interference.

Depending on the interference situation, the eNB detecting the collision can choose either to do nothing (no serious interference), to reduce power or change the MIMO beamforming, to defer the actual transmission for a randomly selected back-off time and reassess the resource allocation, or to choose other resources for transmission.

For fast resolution of contentions at least two safe harbor resources should be reserved for resolving contentions in case the user traffic involves high QoS requirements, such as video transmissions; the safe harbor resources may be used also in case of fast handover.

Collaborative CSI Assessment

In LTE the CSI can be assessed by a UE per time-frequency resource, based on specific information elements detailed in 3GPP TS 36.331 v11.2.0. The CSI components and UE measurements are detailed in 3GPP TS 36.213 v11.2.0.

Interference assessment using zero-power CSI-RS is an efficient measurement which can be used in an embodiment of this invention for determining the CSI and especially its components CQI (Channel Quality Indicator) and RI (MIMO Range Indicator), when different eNBs are transmitting CSI-RS or not (by transmitting zero-power CSI-RS).

The interference assessment is done within the CSI-EVI (CSI-interference measurement) resource.

A simple example is the case when a UE served by eNB1 is assessing CQI in the presence of an eNB2 interferer, which is using the same time-frequency resource, assigned as CSI-IM. For a second CQI and RI assessment by the UE, eNB2 will transmit zero power CST RS using the same configuration and subframe as the CRS-RS transmitted by eNB1.

In this way the UE will report CQI and RI with and without the interference from eNB2; eNB1 can assess the CQI or RI degradation (i.e. the interference impact) created by eNB2.

In another example also eNB3 and eNB4 which transmit data with low power. For having correct results of the CQI and RI assessment, the CSI-RSs transmitted by eNB3 and eNB4 should use low power or zero-power within the CSTIM time-frequency resource. All the other eNBs (eNB2 in this example) influencing the CQI results should transmit the CSI-RS at high power.

The use of the CSTIM should be coordinated and synchronized (if the eNBs are synchronized) between eNBs. If the eNBs are not synchronized, the CSTIM resource should extend, in the selected PRBs, over an entire frame, and no data should be transmitted within the CSI-IM resource.

The coordination of the CSI-RS configuration list and subframe configuration (see 3GPP 36.213) for different eNBs should be done through a X2AP (X2 Application Protocol) or a management message, including, in addition to the existing Radio Resource Control information elements in 3GPP TS 36.331, other information such as the eNB identity, configuration list and subframe configuration for CSI-RS and CSI-IM per eNB, time of measurement start, time of measurement end, indication of the CSI-RS power relative to the maximum data power in PDSCH.

The coordinated scheduling of CSI-RS can be also used for the assessment of interference power by an eNB. When one or more eNBs transmit the CSI-RS with high power, an eNB transmitting CSI-RS with zero power can use its DL Receiver or one or more served UEs to assess the absolute or relative CSI-RS interference power level based on the CSI-RS configuration list and subframe, over the CSTIM interference measurement resource.

Support by the Existing X2AP Interface of Fast Dynamic Resource Allocation

Within the X2AP, the signaling relevant for ICIC is the LOAD INFORMATION message.

The LOAD INFORMATION message with the IE "RNTP per PRB" is a DL power reservation message, stating that the power is not going to exceed the RNTP threshold (value "0"), but gives no guarantees for PRBs marked with value "1". These PRBs may use both high and low power, making impossible a scheduling strategy based on this information. Note that the power reservation is not related to the actual usage of a resource at a given time. Using RNTP is not fast, as for each of the 16 power values the transmission of a different Load message is needed.

In addition, while the power reservation makes sense for macro cell ICIC, serving always a high number of users, the power reservation does not make sense for a small number of users and fluctuating traffic, which is the case for small cells.

In uplink, ICIC is supported by the LOAD INFORMATION message with the IEs "Overload indication"—to signal an unacceptable level of interference, and "High Interference indication", including a bitmap of the intended high power transmissions.

SRS Coordinated Scheduling

SRS are transmitted by the UE based on eNB scheduling. The UE is a source of interference in uplink. The knowledge of the interference created by a specific UE at a specific location is definitely useful for uplink traffic scheduling.

The SRS transmission between the UEs served by different eNBs will collide if no collaborative coordination is made. So it is desirable to apply coordination between the SRS transmissions by different eNBs, to be able to measure the interference impact of a UE or the channel properties between that UE and other base stations. The channel properties are useful in different CoMP (collaborative multipoint) approaches.

Coordinated Beamforming Using SRS

Coordinated beamforming between different base stations achieves high gains based on using downlink (DL) beamforming in reciprocal TDD networks, where it can be assumed that the downlink channel coefficients are identical with the uplink ones. Beamforming can be applied so that the eNB creating interference will pre-code its transmissions so to create nulls in the direction of a victim UE suffering from the interference created by its transmissions.

To apply this technique, the interfering eNB should acquire the channel matrix of those UEs suffering from interference.

For this purpose, it is advantageous that the SRS will be transmitted for measuring the channel matrix ONLY for those time-frequency resources in which the DL interference created by eNB1 is high enough to damage the reception of the intended downlink transmissions from eNB2 by the served UEs.

3GPP TS 36.423, defining the X2AP interface, does not include any IE (Information Element) to signal the status of high interference per time-frequency resource, i.e. per subframe and PRB. Such information would be beneficial for identifying those transmissions creating interference.

For differentiating between:
1. SRS signals transmitted by UEs connected to an eNBs for measuring the channel matrix by other eNBs and
2. Regular use of SRS within a cell, different subframes should be defined for these two types of SRS transmissions, i.e. to define the periodicity of SRS transmissions and the repetitive subframes used for channel matrix measurement, such that the SRS transmissions will not collide with one another.

For example, assuming 10 ms periodicity, the repetitive subframes x can be used for channel matrix measurement by eNB1, the repetitive subframes y can be used for channel matrix measurement by eNB2, the repetitive subframes z and t can be used for channel matrix measurement by eNB3, while all the other can be used by eNB1, eNB2 and eNB3 in regular sounding operation. By such an arrangement the collision of the sounding signals will be avoided, making it possible to accurately determine the channel matrix.

X2AP Suitable Enhancements

There may be three types of enhancements: enhancements to support collaborative dynamic resource allocation, enhancements to support collaborative CSI assessment and UE interference assessment, and enhancements to support SRS scheduling.

X2AP Enhancements to Support Fast Dynamic Resource Allocation

The following Information Elements should be defined:

DL Resource Usage, having as parameters a subset of the following: RASN (resource allocation signaling number (in fact a resource allocation index—may be a random integer), eNB identity, micro-cluster index, absolute radio carrier frequency identifier, subframe number, specific PRBs used for the frequency resource, Tx power used within the resource, CSTRS Tx power relative to PDSCH power, precoding book index per eNB layer, receiving UE(s) identity. For reducing the signaling overhead, the resource allocation signaling number (RASN) or resource allocation index can be used in future communications as a reference to the actual resource allocation and its characteristics listed in this information element.

UL Resource Usage, having as parameters a subset of: RASN (Resource Allocation Signaling Number) or resource allocation index, eNB identity, UE identity, micro-cluster index, subframe number, channel frequency, specific PRBs used, SRS Tx power relative to PUSCH power, precoding book index per UE stream (layer).

NACK indication having as parameters eNB identity, NACK indication to a specific DL or UL resource allocation, which may be indicated by the Resource Allocation Signaling Number or resource allocation index.

Resource Usage Release having as parameters eNB identity, specific DL or UL RASN (time-frequency resource index) or its characteristics.

Resource Usage Change, having as parameters the eNB identity, initial RASN, bitmap of the changed parameters and list of the new values or alternatively the new resource allocation, new allocated RASN (identifier).

Positioning Information, having as parameters eNB identity or UE identity, optionally micro-cluster index, position information for eNB and/or UE.

Retransmission Rate, having as parameters eNB identity, resource allocation signaling number, HARQ number, observation interval.

Sensing Information, having as parameters the identity of the sensing eNB, interference power, the resource allocation signaling number, observation interval.

UE Measurements, having as parameters UE identity, RARN, values of RSRP, RSRQ, CSI (CQI, RI, PMI etc.)

Micro-cluster Index, having as parameters the micro-cluster index (may be a random number) and the identity of included eNBs.

Relaying Information, having as information the eNB identity, its micro-cluster number, the micro-cluster index to which the information is relayed.

X2AP Enhancements to Support Collaborative CSI and UE Interference Assessment

The X2 interface may be enhanced with Information Elements allowing inter-cell coordinated, including zero-power, CSI-RS and CSI-IM. Such an Information Element should include parameters such as eNB identity, configuration list and subframe configuration for CSI-RS and CSI-IM per eNB, time of measurement start, time of measurement end, special power settings (normal power, zero-power).

The results of such a measurement (CQI, RI) can be sent back to the eNBs participating in the measurement as a X2AP information element having as parameters CSI report, SNIR assessment, an index of the used CSI-RS configuration, subframe configuration index and the used CSI-EVI measurement resource.

X2AP enhancement to support SRS Configuration for channel matrix or interference measurement should include the following information:

Cyclic shift (could be defined per antenna port and UE, starting with 0, such that for each UE and antenna port different values will be used); the exact match between UE, antenna port and the cyclic shift is not needed.

Duration—indefinite or limited to the desired beamforming operation.

Hopping: although hopping complicates the collision avoidance, if hopping is used, the hopping bandwidth should be provided.

Subframe(s) of the periodic sequence to be avoided (being used by other eNBs). The subframes should be indicated relative to start of System Frame numbering, using mod 40.

SRS periodicity and offset; the actual transmission offset (subframes) will be programmed by the serving eNB while considering the available information on SRS transmission scheduling by other eNBs.

The peer eNB may not be able to apply the requested periodicity of subframes. If the message is not simply ignored, the peer eNB should return:

Number of cyclic shifts;

For each cyclic shift: Interfered Resource (subframe and PRBs) used in downlink and SRS subframe used in up-link for measurements; should be the same PRB used for DL and for SRS transmissions in uplink, but the subframe may be different Comb usage;

Frequency resources;

Response: Yes to accept; if No, propose an alternative.

Base Station Implementation

Figure 3:
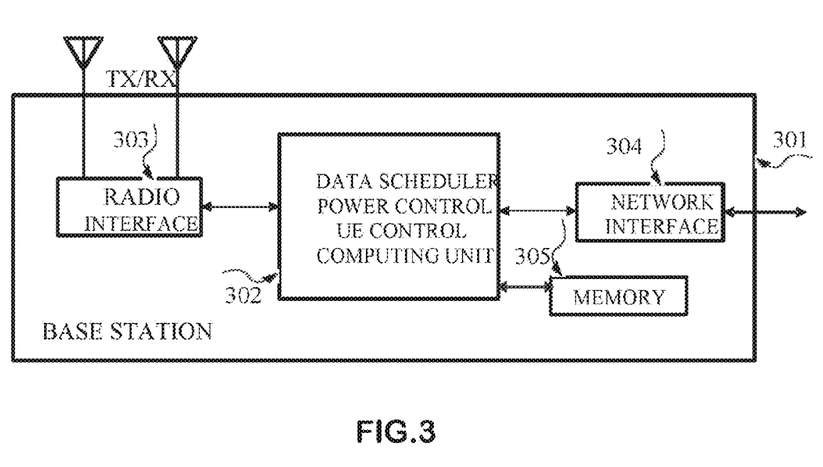

The base station blocks shown in FIG. 3 are only by way of examples; in practical implementations these blocks can be distributed on multiple circuit boards, and the control functions and hardware functions can be implemented on commercial processors or tailor-made logical arrays, such as system-on-a-chip, FPGAs, ASICs.

The functional blocks of the base station—301 identified as relevant to this invention are the radio interface 303, providing wireless communication with a UE, the network (communication) interface 304 enabling message transmission over the network, towards another base station or to the OAM or to other entities in the Operator network. The controller 302 includes as a subset of its functions, some functions relevant to this invention, such as scheduling of the traffic, power control, UE control including the reporting activity and computing functions determining the interference impact of a specific base station. Additional control functions are used in the actions taken by the BS to improve its own wireless throughput as well as the wireless network throughput. The data used by the controller is stored in a memory function—305.

Technologies

This invention can be applied for 3GPP LTE and HSDPA technologies. We have provided examples using the LTE technology, but the proposed protocols and measurement methods can be equally applied for CDMA technologies.

The description of the embodiments above refers to base stations, but other central or distributed wireless transmission entities, such as access points, Node B, etc., can also be operated in similar fashion.

As will be appreciated by those skilled in the art, the terminology used throughout the specification is mainly associated with the LTE standards. However, it should be understood that embodiments of the present invention encompass other cellular standards, such as 802.16 and the like and both TDD and FDD duplexing modes.

The examples provided show certain ways of carrying out the invention. It is to be understood that invention is not intended to be limited to the examples disclosed herein. Rather, the invention extends to all functionally equivalent structures, methods and uses, as are within the scope of the claims.

The invention claimed is:

1. A method for network operation, comprising:
 defining a cluster of neighboring base stations in a cellular network, the cluster comprising at least first and second base stations;

establishing a channel for information exchange between the first and second base stations;

transmitting messages from the first base station to the second base station over the established channel to provide information to the second base station with respect to allocation by the first base station of first time-frequency resources within at least one subframe identified by a subframe number; and allocating second time-frequency resources by the second base station responsively to the messages from the first base station, wherein the messages specify a configuration of CSI-reference signals (CSI-RS) transmission by the second base station so as to cover a CSI-interference measurement (CSI-IM) resource allocated by the first base station, and a UE served by the first base station reports a channel quality indicator (CQI) measured when the first base station transmits zero power CSI-RS within the CSI-IM resource.

2. The method according to claim 1, wherein allocating the second time-frequency resources comprises choosing the second resources to be allocated so as to mitigate interference in communications between the base stations and user equipment (UE).

3. The method according to claim 1, wherein the second time-frequency resources are identical with the first time-frequency resources.

4. The method according to claim 1, wherein transmitting the messages comprises sending updates to the second base station with respect to at least one of changes in the allocation of the first time-frequency resources or release of the first time-frequency resources.

5. The method according to claim 1, where establishing the channel comprises communicating between the first and second base stations over the air.

6. The method according to claim 1, wherein the messages specify a subframe that is specified to repeat according to a pattern.

7. The method according to claim 1, wherein the messages specify a spreading code used by the first base station.

8. The method according to claim 1, wherein the messages specify a transmission power to be used in communications by the first base station.

9. The method according to claim 8, wherein the specified transmission power comprises a power level that is greater than a predefined threshold.

10. The method according to claim 1, wherein the messages indicate that a specified resource is highly interfered.

11. The method according to claim 1, wherein the messages specify a location of at least one of the first base station and user equipment in communication with the first base station.

12. The method according to claim 1, wherein the messages specify a rate of hybrid ARQ (HARQ) retransmissions.

13. The method according to claim 1, wherein the messages specify the result of at least one measurement provided by an identified UE served by the first base station, from the list of RSRP, RSRQ, CSI, the last one including at least one of CQI, RI and PMI.

14. The method according to claim 1, wherein the messages indicate at least one resource whose allocation should be avoided by the second base station.

15. The method according to claim 1, wherein the messages specify a safe harbor resource.

16. The method according to claim 1, where a feedback message and comprising transmitting a NACK message from the second base station to the first base station rejecting a resource allocation specified in the messages.

17. The method according to claim 1, wherein allocating second time-frequency resources by the second base station responsively to the messages from the first base station comprises at least one of reducing transmission power, operating with low power, reducing activity, operating with reduced activity, and blanking the time-frequency resource by the second base station following a specific request from the first base station.

18. The method according to claim 1, wherein the messages specify at least one allocation of frequency resources in a specific subframe that is specified to repeat according to a pattern.

19. The method according to claim 1, where a feedback message indicates at least one of: providing negative feedback on the proposed time-frequency resource allocation, indicating an alternative allocation of time-frequency resources, and informing the first base station of interferences that will be unacceptable.

20. The method according to claim 1, wherein the messages sent by the first base station to the second base station indicate a delay at which the resource allocation is to start within the at least one subframe.

21. A method for network operation, comprising:

defining a cluster of neighboring base stations in a cellular network, the cluster comprising at least first and second base stations;

establishing a channel for information exchange between the first and second base stations;

transmitting messages from the first base station to the second base station over the established channel to provide information to the second base station with respect to allocation by the first base station of first time-frequency resources within at least one subframe identified by a subframe number; and allocating second time-frequency resources by the second base station responsively to the messages from the first base station, wherein the messages specify at least one of a period, subframes, frequency resources and comb to be used for sounding reference signals (SRS) transmission by at least one UE served by the first or by the second base station and the second or first base station respectively measures an interference within the time-frequency resources allocated for SRS transmission.

22. A method for network operation, comprising:

defining a cluster of neighboring base stations in a cellular network, the cluster comprising at least first and second base stations;

establishing a channel for information exchange between the first and second base stations;

transmitting messages from the first base station to the second base station over the established channel to provide information to the second base station with respect to allocation by the first base station of first time-frequency resources within at least one subframe identified by a subframe number; and allocating second time-frequency resources by the second base station responsively to the messages from the first base station, wherein the messages of the first base station specify the time-frequency resources used by a served UE and interfered by downlink transmissions of the second base station and at least one of the list of period, subframes, comb and a configuration of a cyclic shift for SRS uplink transmissions by the at least one UE, and wherein the second base station uses the SRS for assessing the coefficients of the channel matrix and allocating beamforming nulls towards the at least one UE, in the time-frequency resources affected by downlink transmissions of the second base station.

23. A cellular communication system, comprising a cluster of neighboring base stations in a cellular network, the cluster comprising at least first and second base stations,
wherein the base stations are configured to establish a channel for information exchange between the first and second base stations, to transmit messages from the first base station to the second base station over the established channel to provide information to the second base station with respect to allocation by the first base station of first resources within at least one subframe identified by a subframe number, and to allocate second resources by the second base station responsively to the messages from the first base station,
wherein the messages specify a configuration of CSI-reference signals (CSI-RS) transmission by the second base station so as to cover a CSI-interference measurement (CSI-IM) resource allocated by the first base station, and a UE served by the first base station reports a channel quality indicator (CQI) measured when the first base station transmits zero power CSI-RS within the CSI-IM resource.

24. A wireless base station, comprising:
a radio interface, configured for communicating over a wireless network;
a communication interface, configured for exchange of messages with other base stations in the wireless network; and
a processor, which is configured to define a cluster of neighboring base stations in the wireless network, the cluster comprising at least one further base station, to establish a channel for information exchange with the at least one further base station via the communication interface, to transmit and receive messages from and to the at least one further base station over the established channel in order to exchange information with respect to allocation by the base station of time-frequency resources within at least one subframe identified by a subframe number, and to allocate the time-frequency resources responsively to the messages,
wherein the messages specify a configuration of CSI-reference signals (CSI-RS) transmission by the second base station so as to cover a CSI-interference measurement (CSI-IM) resource allocated by the first base station, and a UE served by the first base station reports a channel quality indicator (CQI) measured when the first base station transmits zero power CSI-RS within the CSI-IM resource.

* * * * *